(No Model.)  4 Sheets—Sheet 1.
J. R. REYNOLDS.
MACHINE FOR CUTTING GROOVES IN ROLLS.
No. 256,165. Patented Apr. 11, 1882.
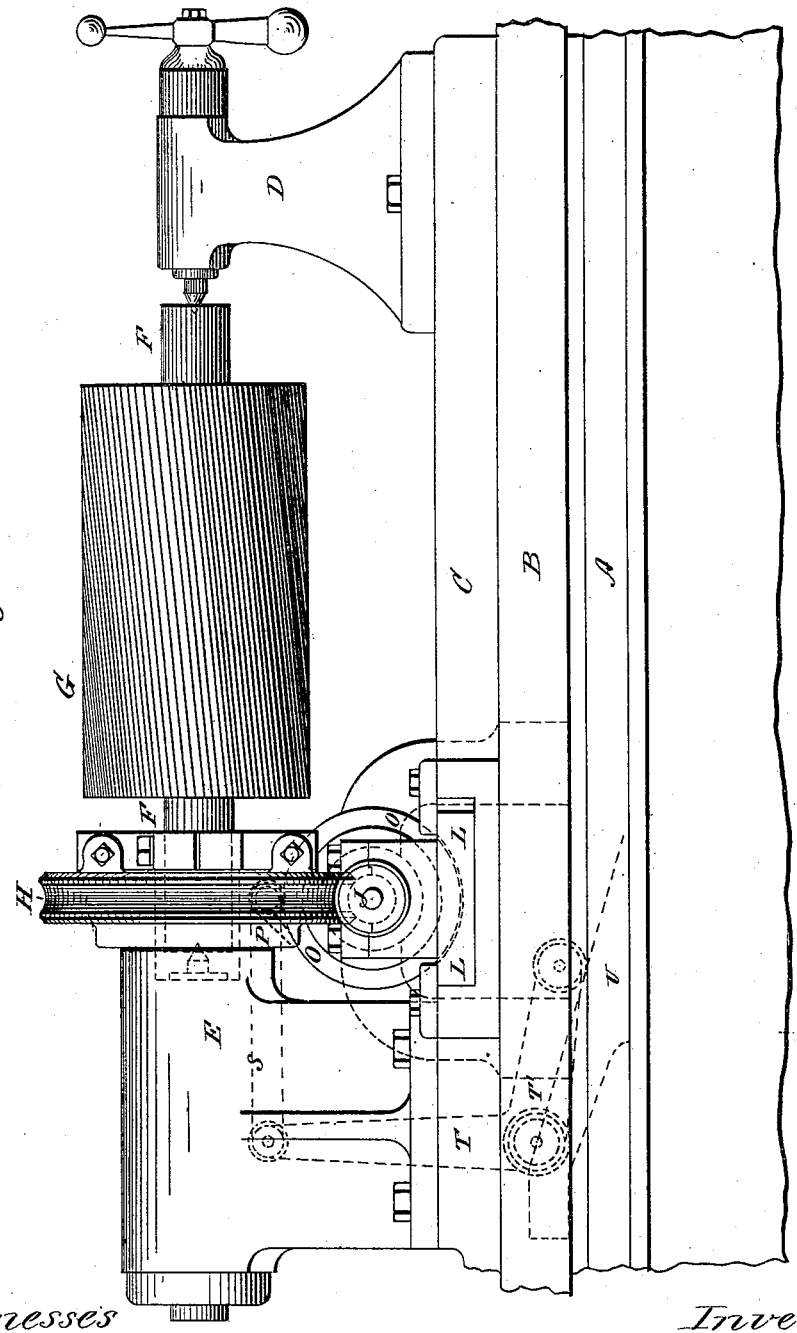

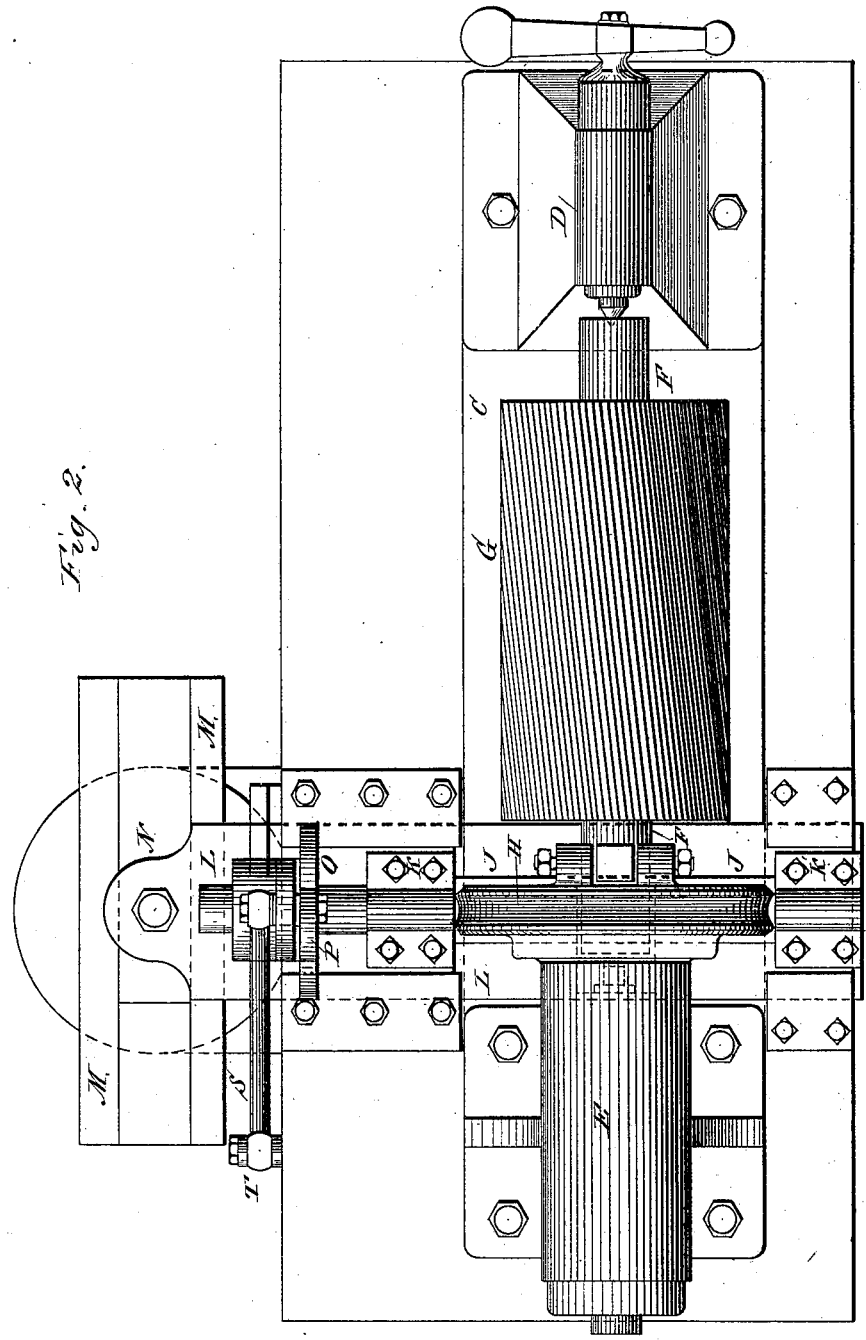

(No Model.)
J. R. REYNOLDS.
MACHINE FOR CUTTING GROOVES IN ROLLS.
No. 256,165.    Patented Apr. 11, 1882.
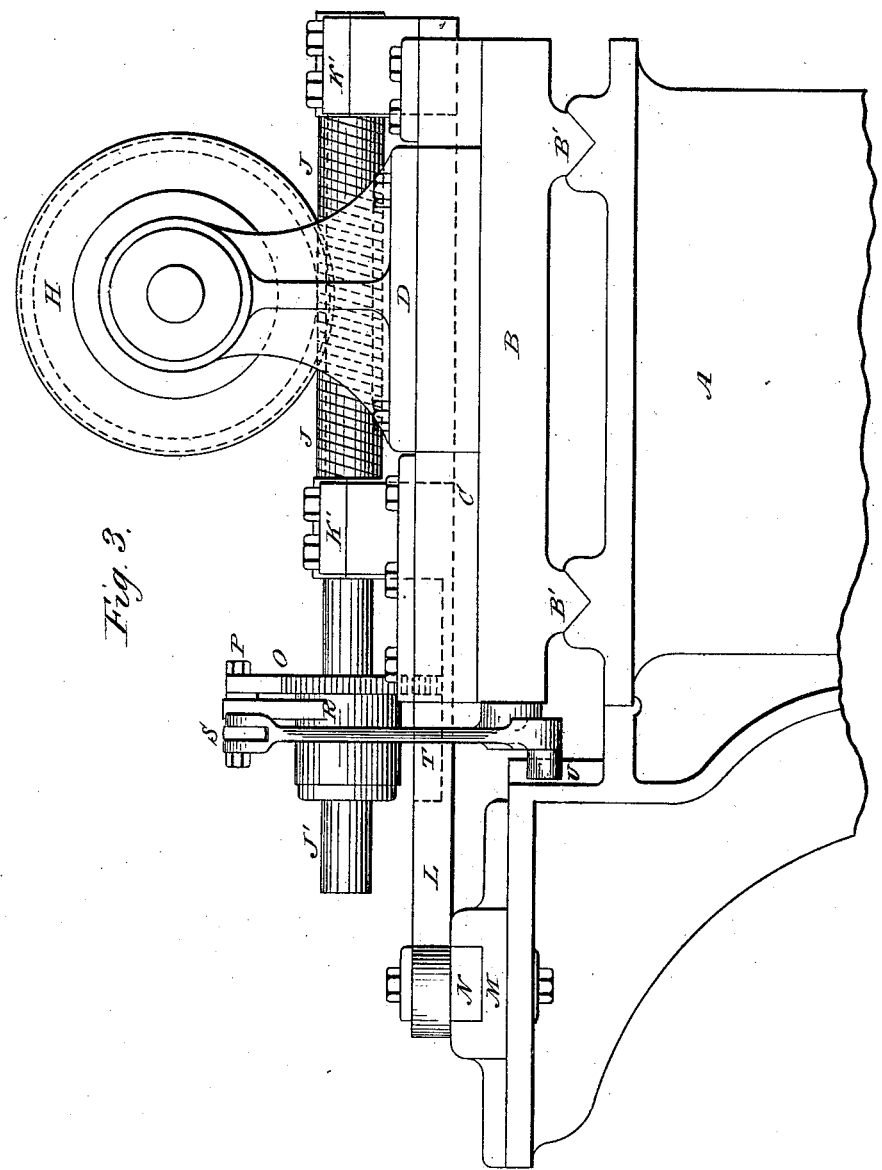

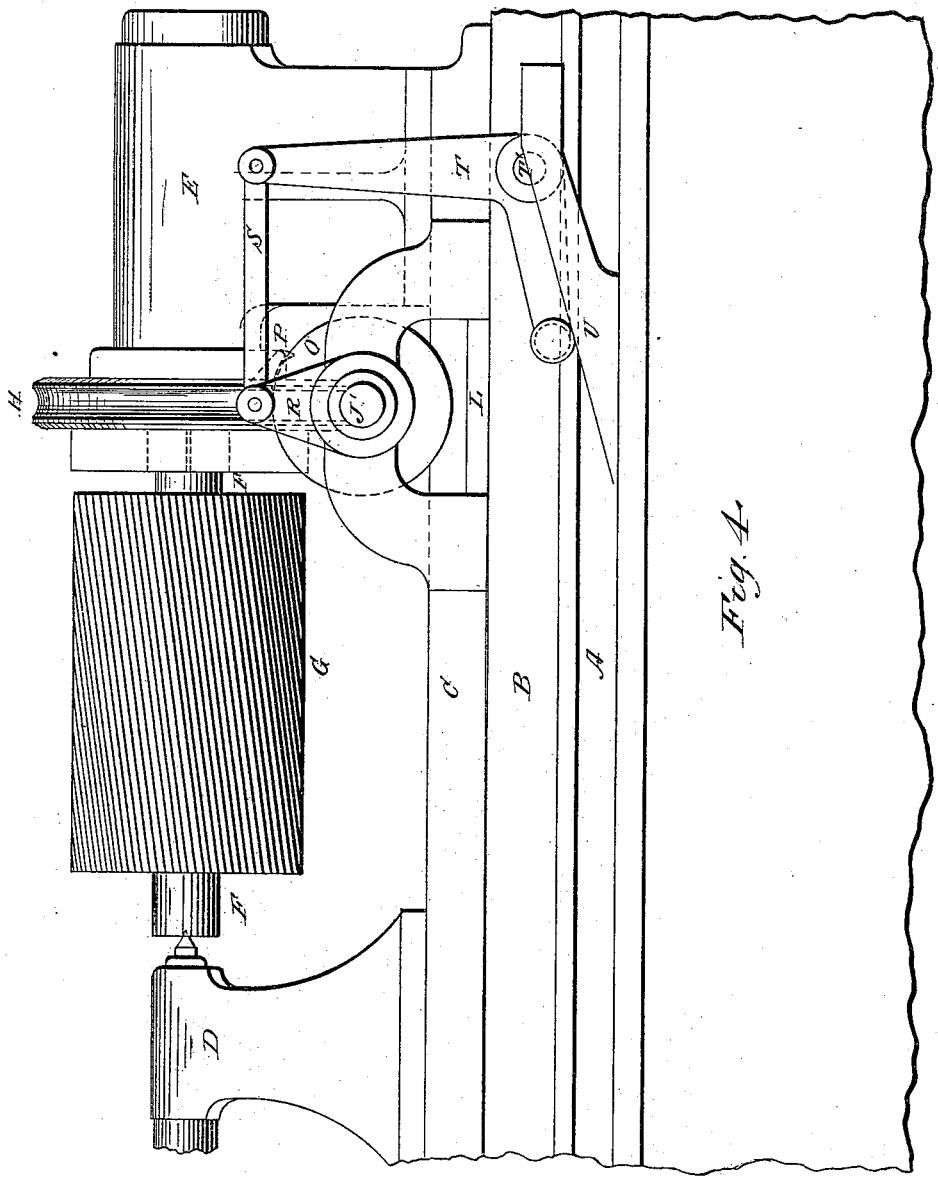

UNITED STATES PATENT OFFICE.

JOHN R. REYNOLDS, OF HARTFORD, CONNECTICUT, ASSIGNOR TO THE PRATT & WHITNEY COMPANY, OF SAME PLACE.

MACHINE FOR CUTTING GROOVES IN ROLLS.

SPECIFICATION forming part of Letters Patent No. 256,165, dated April 11, 1882.

Application filed July 2, 1881. (No model.)

*To all whom it may concern:*

Be it known that I, JOHN R. REYNOLDS, of Hartford, in the county of Hartford and State of Connecticut, have invented certain new and useful Improvements in Mechanism for Cutting Spiral Grooves in Rolls; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to a mechanism or device to be attached to an ordinary metal-planing machine, for the purpose of cutting spiral grooves in rolls; and it relates more especially to the construction of the parts by which the roll is rotated while the groove is being planed or cut, and by which it is fed or turned from one groove to the next.

The object of my invention is to provide a simple mechanism which shall operate automatically to effect the above movements by the reciprocating movement of the planer bed-plate.

In the accompanying drawings, (on four sheets,) illustrating my invention, Figure 1 is a side view of the mechanism for suspending the roll and rotating it as the grooves are cut, attached to the bed-plate of a metal-planing machine. Fig. 2 is a top view of the same. Fig. 3 is an end view, showing the frame and bed-plate of the planer with my improved mechanism attached. Fig. 4 is a side view of my improved mechanism on the opposite side from Fig. 1.

A is the fixed frame of an ordinary metal-planing machine.

B is the bed-plate which moves upon the frame on slides B' in the customary manner.

C is a plate which carries the heads for supporting the roll to be grooved. This plate is bolted to the bed-plate of the planing-machine.

D is the block which carries the movable spindle, forming the center upon which the arbor carrying the roll turns. This is operated by a screw and crank-handle in the customary manner.

E is the head which carries the fixed center upon which the arbor of the roll turns, and also supports and carries the mechanism for turning and feeding the roll as the successive cuts are taken to form the grooves.

F is the arbor which supports the roll and turns upon the centers in the usual manner.

G is the roll operated upon.

H is a worm-wheel turning in bearings in the head E. This is connected with the arbor F by a dog in the usual manner when a roll is in the machine.

J is a worm which turns and operates the worm-wheel H. This worm turns in boxes K K', attached to or forming part of a sliding plate, L, which can be moved laterally across the machine in ways or guides upon the plate C.

M is a groove or guide formed in a piece attached firmly to the fixed frame A of the planing-machine. This is attached in such a manner that any desired inclination may be given to it relatively to the line of motion of the plate L.

N is a sliding block moving back and forth in the grooved piece M, and pivoted to the outer end of L, so that as the block N passes back and forth in the groove it draws the plate L and the worm J back and forth laterally across the machine and rolls the worm-wheel H upon the worm as a rack, thus turning the arbor of the roll through the required angle to cut the spiral groove, the tool which cuts the groove being fixed to the tool-block of the planer and remaining stationary, while the bed-plate moves with the customary reciprocating motion. By setting the grooved piece M at different angles the inclination of the spiral may be varied to any degree. In the drawings the groove is set parallel to the line of motion of the bed-plate, or at right angles to the motion of the plate L, so that the worm would have no end motion and a straight groove would be cut by the tool.

The worm J is also used to feed the roll around by regular intervals, so as to cut a series of grooves, taking one cut in each groove successively. This is accomplished by the following mechanism: The arbor J' of the worm J extends outside of the box K and passes through the ratchet-wheel O, to which it is connected by a spline, so that it turns with the wheel, but can move longitudinally. This ratchet-wheel is operated by a pawl, P, attached to an arm, R, which can turn freely upon the arbor J'. The arm R is rocked by means of the connecting-rod S, which is attached to the bell-crank T. This bell-crank or double lever is pivoted at its angle T' to the bed-plate B, and its lower arm is provided with a roller which mounts upon the inclined piece U, which is attached to the fixed frame of the planing-machine. As the bed-plate B reciprocates back and forth at the end of each movement the end of the lever T rises upon the incline U and moves the pawl, which imparts a rotary motion to the worm. This acts upon the worm-wheel H and turns the roll the distance from one groove to the next. When the bed-plate moves back again the end of lever T drops and allows the pawl to move back, so as to take up another position on the ratchet, ready to turn it, when the lever again acts by mounting the incline U.

It will thus be seen that the worm and its connecting mechanism performs a double function. It serves as a rack to move longitudinally and turn the wheel H, and at the same time, by its rotary movement, it serves to feed the wheel forward by impulses given at the end of each longitudinal motion.

By means of my improvement a very simple mechanism performs the complicated motions required to cut the spiral grooves in the roll G, and at the same time feed the roll forward from groove to groove automatically.

What I claim as my invention is—

1. The combination of the reciprocating plate L, the guide M, the worm J, and the wheel H with the fixed frame and bed-plate of a planing-machine, whereby the said worm is made to act as a rack to turn the wheel H, substantially as described.

2. The combination of the sliding plate and worm L J upon the moving bed-plate B with the ratchet and pawl O P, the connecting-levers S T, and the incline U upon the fixed frame A, substantially as described.

JNO. R. REYNOLDS.

Witnesses:
EDWIN F. DIMOCK,
THEO. G. ELLIS.